Nov. 1, 1938.　　　　B. C. PHILLIPS　　　　2,134,889
COMPRESSION CONTROL
Filed July 6, 1935　　　5 Sheets-Sheet 1

INVENTOR
B.C. Phillips

Nov. 1, 1938.  B. C. PHILLIPS  2,134,889
COMPRESSION CONTROL.
Filed July 6, 1935  5 Sheets-Sheet 2

INVENTOR
B.C. Phillips

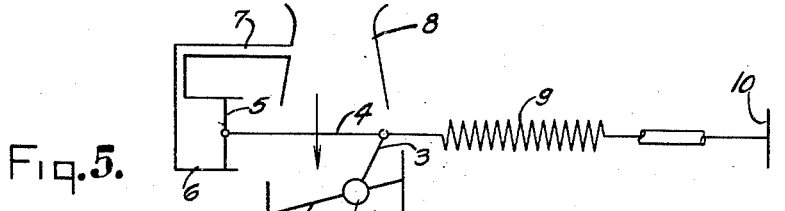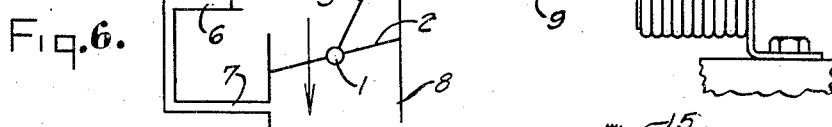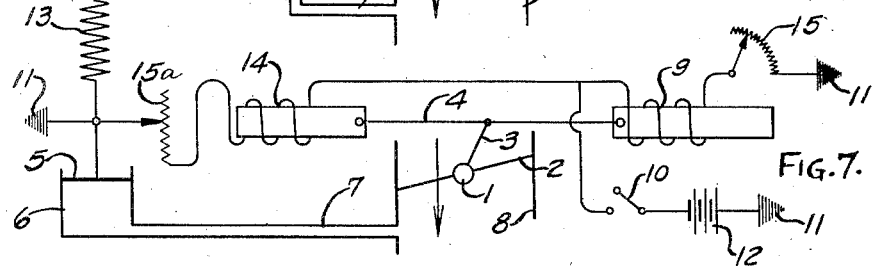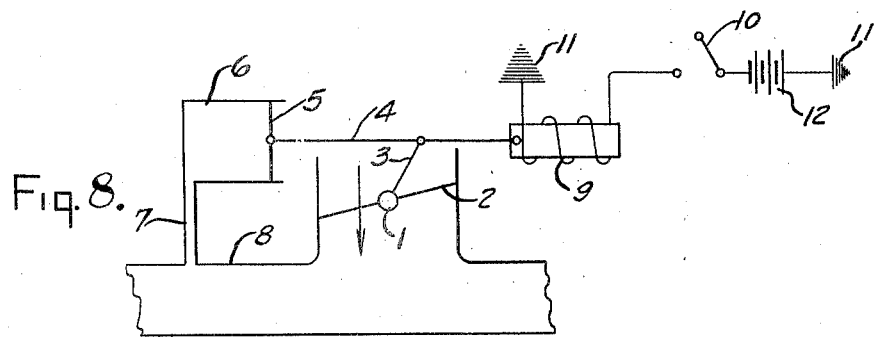

Patented Nov. 1, 1938

2,134,889

UNITED STATES PATENT OFFICE 2,134,889

COMPRESSION CONTROL

Bernard C. Phillips, Detroit, Mich., assignor, by direct and mesne assignments, to Frank A. Kane, Astoria, Long Island, N. Y.

Application July 6, 1935, Serial No. 30,188

8 Claims. (Cl. 123—103)

My invention relates to compression control systems such as are adapted to internal combustion engines.

The object of my invention is to provide a means to control the compression pressure of the engine in accordance with engine requirements.

A more specific object of my invention is to provide suitable means for controlling the maximum pressures of an overcompressed engine and thereby obtain high efficiency at partial loads.

Another object of my invention is to provide a means to regulate or adjust the compression pressure of an internal combustion engine to avoid detonation when different grades of gasoline or other fuels are used.

Another object of my invention is to provide a means for increasing the compression pressure of an internal combustion engine at high altitudes. In the present type of internal combustion engine a rise in altitude is attended by a drop in compression pressure while with the use of my invention the compression pressure can be kept substantially constant.

Another object of my invention is to produce a means which permits the lowering of the compression pressure to reduce the detonation or a "knock" producing tendency of carbon formation.

Another desirable feature of the invention is the lowering of the minimum speed of the engine. Since the manifold vacuum does not fall to a value approaching zero at very low speeds, the resulting high velocity and reduced pressure atomizes the fuel more thoroughly, making a mixture that will lift more readily at the valve port. This feature of good pulverization of fuel at low rates of fluid flow permits the use of large intake passageways which will assist the engine in developing maximum power at high speeds where the invention may be calibrated to be inoperative.

In the present design of internal combustion engines it is necessary to use a compression ratio such that the engine will operate without undue detonation at low speeds, with a certain grade of gasoline. Consequently, a given engine is limited in the grade of gasoline that can be used for its operation, and considerable power drop is assumed at high speeds. With the use of my invention an engine can be designed with a higher compression ratio than it could normally use since the detonation tendency is lessened at low speeds.

With the above and other objects in view, I have hereinafter described means of carrying out the objects, in the form of description of apparatus illustrated on the accompanying drawings of which:

Fig. 5 is a diagrammatic view of the invention showing a different construction.

Fig. 6 is a diagrammatic view of fundamentals of Fig. 1 excepting the spring is controlled by a barometric sensitive element.

Fig. 7 is a diagrammatic view of the fundamentals of Fig. 1 showing electrical effort substituted for the opening forces of both the suction piston and spring.

Fig. 8 is a diagrammatic view of the fundamentals of Fig. 1 with magnetic effort substituted for the spring.

Figure 1:
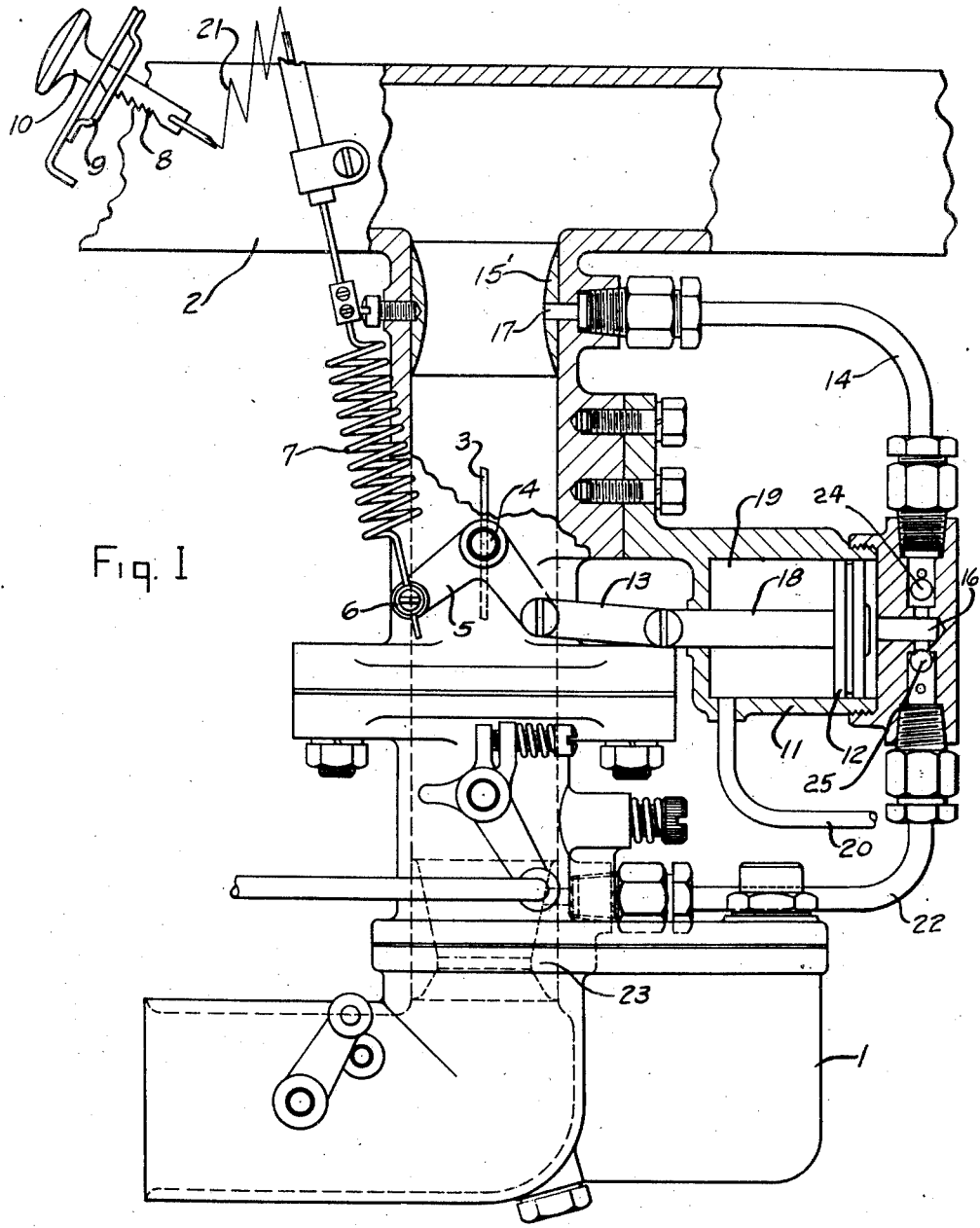
Fig. 1 is a view, partly in section of a carburetor and an intake manifold embodying my invention.
Figure 3:
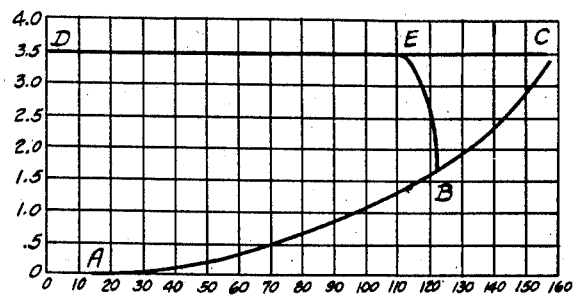
Fig. 3 is a plot illustrating the normal open throttle restriction and controlled restriction throughout the flow range.
Figure 4:
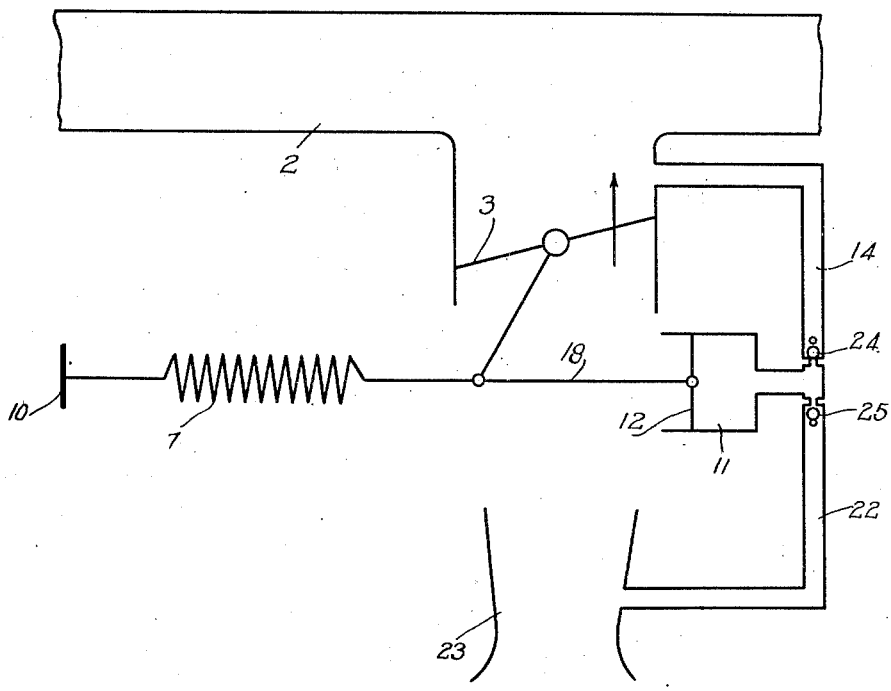
Fig. 4 is a diagrammatic representation of the form of this invention substantially in accordance with the structure of Fig. 1.

Referring to Fig. 3 of the drawings, the plot there shown has reference to the normal open throttle manifold depression and the depression as controlled by the construction shown in Fig. 1. In the plot the abscissae represents the volume of mixture flow in cubic feet per minute. The ordinates represent the manifold vacuum in inches of mercury. The curve ABC represents the flow resistance of a normal induction system. It is to be noted that for the lower flow rates this resistance is comparatively low, which insures high engine volumetric efficiency. The rapid increase of the flow resistance at the high flow rates causes a corresponding lack of proper cylinder filling. Since the tendency for an engine to knock while operating under open throttle varies with the compression pressure it follows that the average engine will detonate more severely at low and intermediate speeds. Since internal combustion engines, especially of the automotive type, use as high a compression ratio as possible without appreciable knocking at any speed, it follows that some power and efficiency must be sacrificed at high speeds by the selection of a compression ratio that will not cause detonation at low speeds. By using a lower clearance combustion chamber and controlling the open throttle induction resistance to some curve similar to DEC Fig. 3, the knocking tendency due to compression would be substantially constant throughout the speed range, and the thermal efficiency would be increased at all speeds and loads. In some engines there would be a little loss of power at low speeds but this slight sacrifice would be more than offset by the gain in efficiency and the increase in power at high speeds.

Some engines are lacking in detonation tendency at high speeds which would permit removal of the intake throttling at some flow rate considerably below that corresponding to maximum speed. For such engines a throttling curve corresponding to DEBC should be followed for maximum results.

Fig. 1 shows a device designed to take advantage of these fundamental internal combustion engine characteristics.

Referring to Fig. 1 of the drawings 1 is an updraft carburetor connected to an intake manifold 2. In the inlet of the intake manifold 2 is located a butterfly valve 3 rigidly mounted on a shaft 4. Without the intake manifold 2 is a double armed lever 5 which is rigidly fastened to the shaft 4. At one end of the lever 5 is fastened a trunnion 6. One end of the spring 7 is fastened to the trunnion 6 and the opposite end of the spring is connected to the dash control button stem, having notches 8 which engage with the plate 9.

It is to be noted that varying the position of the dash control button 10 changes the tension of the spring 7. The desired position is securely maintained by the interlocking of notches 8 with the plate 9.

The piston 12 is located in the cylinder 11. The operating clearance between the cylinder 11 and piston 12 is necessarily low in order to substantially produce a gas tight fit. There is very little clearance between the piston 12 and the cylinder 11. One end of the cylinder 11 communicates with the intake manifold 2 through the passageway 17. The passageway 17 terminates near the most restricted portion of the venturi 15. The left end of the cylinder is vented to the breather pipe or to the upper part of the crankcase through the passageway 20. This prevents dust and dirt from entering the cylinder 11 which would cause the cylinder walls and piston to wear or cause the piston to stick. The venting of the cylinder 11 to the crankcase has an additional feature in that a very small amount of oil vapor is constantly drawn into the unit thus lubricating the mechanism.

The piston rod 18 is connected to one arm of the lever 5 by means of the loose link 13 so that when the piston 12 moves the lever 5 moves which in turn operates the butterfly valve 3.

Assuming the invention is installed on a motor car with abnormally low clearance volume, the operation of my invention is as follows:

When the engine is not running the only force that is applied to the double armed lever 5 is the force applied by the spring 7. This tends to rotate the butterfly valve 3 in a clockwise direction, consequently the butterfly valve 3 substantially closes the passageway in the intake manifold 2.

As soon as the engine is cranked or started the pressure in the intake manifold becomes sub-atmospheric. This sub-atmospheric pressure or vacuum is applied to the right side of the piston 12 by means of the passageway 17, the tube 14 and the passageway 16. The atmospheric pressure on the left side of the piston 12 moves the piston to the right. This turns the lever 5 which elongates spring 7 until the increased tension in the spring 7 balances the difference of the atmospheric pressure and vacuum which are respectively applied to the two faces of the piston 12. It will readily be seen that the greater the manifold vacuum the further to the right the piston 12 will be located when an equilibrium of pressure is reached between the operating forces. At high vacuum, say 6 inches of mercury or above, the piston 12 will travel to the right end of the cylinder. When the vacuum drops in the intake manifold the spring tension more than overcomes the difference between the forces of the atmospheric pressure and the vacuum on the piston 12. The spring then shortens and the piston moves to the left until the forces are again in equilibrium.

As soon as the engine is started, with the carburetor throttle in the idling position, the vacuum in the intake manifold 2 causes the piston to move to the right simultaneously opening the valve 3. The relationship of the various parts under these conditions is shown in Fig. 1. If the carburetor throttle is gradually opened to a load not greater than about three fourths full load, the vacuum in the intake manifold 2 drops gradually but remains high enough to keep the butterfly valve 3 open. Thus if the automobile is gradually speeded up the valve 3 remains open and is ineffective. If the automobile is kept running at any constant speed substantially below top speed the intake manifold vacuum remains high enough to keep the valve open.

From this it can readily be seen that a partial throttle or ordinary driving the engine, equipped with my invention, has all the advantages of a very high or over-compressed engine.

If the engine is running at partial throttle and then the throttle is suddenly opened the manifold vacuum suddenly drops. The resultant force of the two forces acting on the two faces of the piston 12 is then overcome by the tension of spring 7. The lever 5 then rotates and partially closes the valve 3. As the valve 3 is closed the intake manifold is restricted. The manifold vacuum then rises and the position of valve 3 varies until a position is reached where the forces acting on the lever 5 reach a state of equilibrium. In actual practice this state of equilibrium is reached in a fraction of a second.

If the carburetor throttle remains open and the car speed increases the throttling valve 3 will gradually open, thus maintaining a practically constant manifold vacuum at low and intermediate speeds. As the speed of the engine increases and approaches its power peak, the suction due to the velocity of flow of fluid in the venturi 15 becomes an important factor. This reduced pressure is then applied to the right side of the piston 12 through the passageways 17 and 14, consequently the valve 3 will be opened earlier in respect to mixture flow than it would if the piston 12 would not be subjected to the reduced pressure of the venturi 15'. It will readily be seen that at high engine speeds and wide open throttle the valve 3 will be wide open.

An alternate construction in which it is possible to substitute the carburetor venturi for the action of the venturi 15 is shown by the ball check valves 24 and 25 and the pipe 22 terminating in the carburetor venturi 23. The action of the check valves is as follows: Under light loads the high vacuum in the manifold 2 draws ball 24 off its seat and the lower ball 25 is held closed, thus applying the high manifold vacuum to the piston 12. Under the condition of low speeds and heavy engine load the balls will keep the position shown in Fig. 1, but the throttle blade 3 will be in an intermediate position determined by the tension of spring 7 and the rate of fluid flow. At high speeds the velocity suction head in venturi 23 becomes effective and draws ball 24 on its seat and opens ball check 25. The velocity head is then applied to the piston 12 to reopen the throttling member 3.

In this manner an engine with an abnormally low clearance volume may be automatically throttled throughout the maximum torque range and progressively dethrottled at higher speeds, thus increasing the effective compression and efficiency at high speeds to offset the normal loss of power due to the drop in volumetric efficiency. It can readily be seen that with the use of my invention many of the advantages of a high compression engine are obtained without detonation.

My invention also has a means whereby the spring tension of the spring 7 may be varied. The dash button 10 is connected to the spring 7 by a wire or other means. The broken line 21 indicates the connection. As the knob 10 is pulled out the notches 8 engage with the plate 9, holding the knob 10 in the desired position. The spring tension is then increased so it requires a greater manifold vacuum to open the butterfly valve 3, which means that for a given engine speed the valve 3 will be more nearly closed than if the additional spring tension had not been added. This in turn means a decreased compression pressure. By means of this control a lower grade of fuel may be used and the operator can control the compression pressure in such a way as to avoid objectionable detonation.

In the same manner the compression pressure can be regulated to meet engine requirements. For example, when there is considerable carbon in the engine the engine will detonate more easily. By simply increasing the spring tension of my invention the compression pressure is lowered and detonation no longer occurs.

Figure 2:
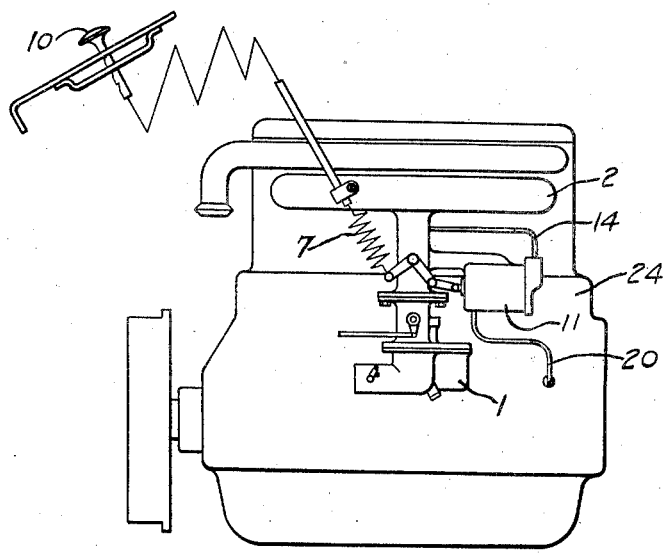
Fig. 2 is a view of the invention as applied to an internal combustion engine of the type used in automobiles.

Fig. 2 shows the invention applied to an internal combustion engine of the type used in automobiles, the pipe line 22 of Figure 1 being omitted.

Referring to Fig. 5 it will be seen that the form of the invention shown is composed of an unbalanced throttling valve 2 mounted on a shaft 1 and suitably linked to a piston 5 and spring 9 by linkage 3 and 4. The piston 5 operates in a cylinder 6 and is connected to a restricted portion of the intake passageway 8 by a tube 7. Spring 9 exerts a closing effort on the valve 2 through the arm 3. The control button 10 allows manual regulation of the tension of spring 9.

The operation of the device as shown in Fig. 5 is as follows:

If the engine is not running the position of the various parts will be substantially as shown. At light loads and low speeds the valve 2 will be slightly open. As load and speed is increased the valve will open further in response to engine demand. After a predetermined flow rate is reached the suction due to high velocity in the restricted portion 8 is great enough to cause the piston to overcome the spring 9 and other forces and entirely open valve 2.

The diagrammatic construction shown in Fig. 6 is identical to Fig. 1 in operation with the exception that instead of manual control of spring 9, it is controlled automatically by a barometric sensitive element 10.

It is well known that the compression pressure and power output of an internal combustion engine decrease with altitude. If a low clearance combustion chamber is fitted to such an engine the power developed at high altitudes will be greater but such an engine will knock dangerously under full load at the lower levels. The common remedy in the past has been to manually throttle such an engine progressively as altitude is lost. The objection to this method is that the control is too sensitive and requires constant attention. The design in Fig. 6 overcomes this difficulty in the following manner: At low altitudes and high barometric pressures the gas filled bellows 10 is compressed thereby increasing the tension of spring 9. The increased closing effort of spring 9 transmitted to the throttle shaft 1 will cause a higher vacuum in passageway 8 in order to give the piston 5 sufficient power to open the throttle the required amount. At high altitudes the action is reversed. By proper design and calibration of this form of my invention an overcompressed or supercharged engine may be properly and automatically throttled at all altitudes.

Fig. 7 is a diagrammatic drawing of a construction that has the same effect on an internal combustion engine as Fig. 1; however, the source of throttle control energy is electrical instead of mechanical. This particular design is adaptable for remote control and where electrical energy is plentiful such as a gas electric generating plant.

Referring to Fig. 7, parts 1 and 2 compose the throttling member. This throttling member is suitably linked to the magnetic armatures 9 and 14 by linkage 3 and 4. A current source 12 is connected to the magnets by a switch 10. The strength of magnet 9 may be controlled by a rheostat 15. The vacuum cylinder 6 is connected to the manifold 8 by the tube 7. The piston 5 operates the rheostat 15a against a calibrated spring 13 and thus regulates the current flow through magnet 14.

The operation is as follows:

Assuming the switch 10 is closed and the engine idling or operating under a light load, the vacuum in the manifold 8 will be comparatively high and will draw piston 5 into cylinder 6 and in doing so the resistance to current flow to magnet 14 will be lessened. Thus magnet 14 will be the controlling member and the throttling member 2 will be opened. If the throttle is opened the vacuum in manifold 8 will attempt to drop to low valve. If the vacuum drops below a predetermined value the spring 13 will withdraw piston 5 from cylinder 6 and thereby increase the resistance to current flow in coil 14. Coil 9 will temporarily attempt to close the throttle 2. However, as the throttling member 2 is closed the vacuum in manifold 8 is increased and a balance is soon assumed between the opening and closing efforts on the throttling member 2. This balance of the throttle controlling forces may be selectively controlled by the rheostat 15 which regulates the closing effort on the magnet 9. Thus the less the resistance used in rheostat 15 the greater will be the minimum vacuum in manifold 8.

Fig. 8 is a diagrammatic view of a combination of the throttle closing means of Fig. 7 and a throttle opening means of Figs. 1 and 6. The operation is substantially the same as described for Fig. 1. It is to be noted that where magnetic means is used to preload or open the valve 2 no special means is necessary to reopen the throttle at high flow rates when such a condition is desirable. The reason being, of course, that a spring must necessarily increase in effort as it is deflected while a solenoid may be designed to increase or decrease in effort as desired.

Figure 9:
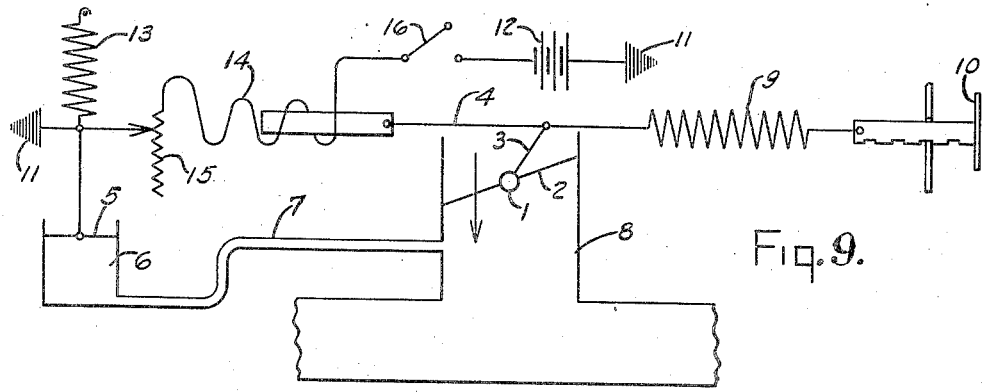
Fig. 9 is a diagrammatic view of a combination of the throttle opening control of Fig. 7 and closing control of Figs. 1 and 5.

Fig. 9 shows a combination of the throttle closing means of Fig. 1 and the opening means of Fig. 7. The ultimate effect on the engine is substantially the same as described for Fig. 1. The switch 16 may be used as a remote control to stop the flow of fluid or allow the valve 2 to close to a predetermined position.

Figure 10:
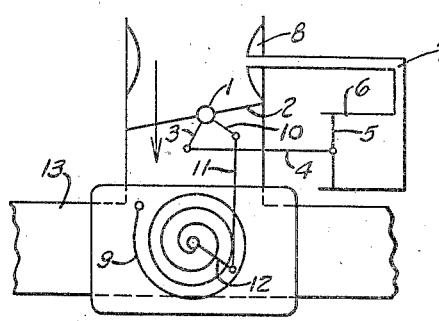
Fig. 10 is a diagrammatic view of a construction similar to Fig. 5 with thermostatic control of the closing effort on the throttling member.

Fig. 10 is composed of the throttle valve and throttle opening means of Fig. 5 like members referring to like parts. The throttle construction is composed of a thermostatic spring 9 operating on shaft 1 through suitable linkage 10, 11 and 12. The spring 9 is thermally connected to the engine usually close to the exhaust system or water jackets.

The operation is as follows:

When the engine is cold the thermostatic spring deflects in a direction to increase the closing effort on valve 2. The result of this increased closing effort is to increase the depression in the engine side of the manifold 13. The increased depression and higher fluid velocity past the valve 2 atomizes the mixture thoroughly allowing the engine to be operated almost normally at temperatures approaching zero. As the engine warms up to normal temperature, the tension in excess of the predetermined tension—is progressively lessened to normal.

Figure 11:
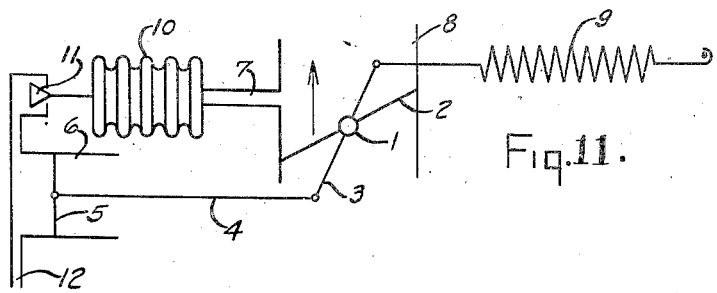
Fig. 11 is a diagrammatic view of a combination showing hydraulic opening of the throttle member.

Fig. 11 shows a variation of the principles described in Fig. 1. The closing effort on the throttling member is obtained by mechanical means substantially the same as described in Fig. 1. However, the automatic opening and regulating effort is secured by a combination of hydraulic and pneumatic methods. Referring to Fig. 11 it will be noted that a bellows 10 is connected to receive suction from the passageway 8 through tube 7 and operates an escapement valve 11. The cylinder has a suitable piston 5 therein which is linked to the throttle shaft 1. A source of hydraulic pressure may be constantly supplied to cylinder 6 by a tube 12. The operation of this combination is as follows:

Under idling conditions where there is a high vacuum in the passageway 8 the bellows 10 is caused to shorten which closes valve 11. The hydraulic pressure supplied by pipe 12 is then exerted on the piston 5 and opens valve 2 against the closing effort of spring 9.

If the engine is idling and the throttle is suddenly opened the vacuum in passageway 8 will drop momentarily to a low value allowing the bellows 10 to elongate and open valve 11. Since there is little or no opening effort being exerted on the throttle valve 2 it will be closed by spring 9. The closing of the valve 2 causes the vacuum in the passageway 8 to rise again to a predetermined value where the bellows again becomes the controlling element. As the flow in the passageway increases the valve 2 will progressively open in order to keep the downstream vacuum substantially constant.

Figure 12:
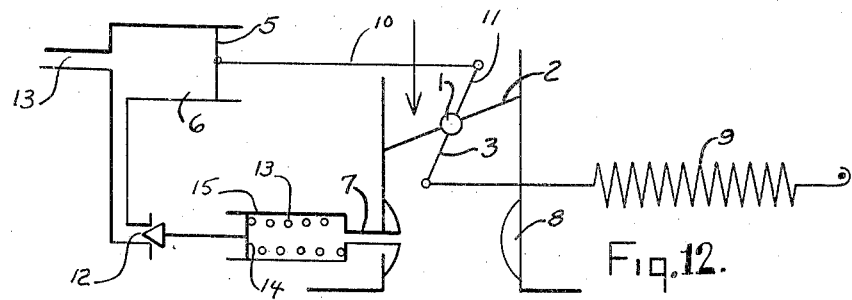
Fig. 12 is a diagrammatic view of a combination showing hydraulic closing of the throttling member.

Fig. 12 is a combination of pneumatic control of hydraulic effort operating to close the throttling member against a mechanical opening effort. The hydraulic piston 5 operates through linkage 10 and 11 to close the throttling member. Automatic regulation of the hydraulic pressure operating on piston 5 is accomplished by a vacuum controlled vent composed of a valve 12, a spring 13, piston 14, cylinder 15, and suction tube 7, terminating in venturi 6. Hydraulic pressure is supplied through tube 13. Spring 9 exerts an opening effort on shaft 1 through arm 3.

The operation is as follows: Under light loads when the vacuum in the manifold is relatively high piston 14 will be drawn to the right and the escapement valve 12 will be open. Since under this condition the pressure is low in cylinder 6 the spring 9 is the controlling factor and the throttling member 2 is opened. At low speeds under heavy loads, the vacuum applied on piston 14 is insufficient to compress spring 13. Vent 12 is then closed and the pressure operating on piston 5 is great enough to close the throttle valve 2. The manifold vacuum then rises to a predetermined value where a balance is reached between the vacuum and the vent valve 12. At a predetermined relatively high rate of flow the velocity suction head in the venturi 6 becomes effective and opens the valve 2.

Spring 9 in Figs. 11 and 12 is of the thermostatic type where temperature variation is an important factor. The effort of this spring may also be varied by a barometric sensitive element if atmospheric pressure is deemed the ruling condition.

While I have described several embodiments of my invention, I do not wish to be limited to the particular forms shown and described, as it will be apparent that many modifications therein may be made without departing from the scope of my invention, as set forth in the appended claims.

Having thus described my invention, what I claim is:

1. A throttling device for controlling the flow into an internal combustion engine of the final air and fuel mixture, comprising a valve normally substantially obstructing the intake of said mixture into said engine, and means operatively connecting two suction portions of the engine remote from each other to said valve whereby an opening effort is exerted against the valve in response to the suction in that one of said portions where the depression is greater.

2. In an internal combustion engine, an intake manifold, a carburetor, a venturi in said carburetor, an intake conduit communicating between said venturi and said manifold, a valve in said conduit for controlling the flow into the manifold of the final fuel and air mixture, variably adjustable means exerting a continuous closing effort of predetermined magnitude on said valve, a piston operatively connected to said valve, a cylinder operatively housing said piston and having one end thereof in communication with a region of substantially atmospheric pressure, two channels connecting the other end of the cylinder to the intake manifold and venturi respectively, and a one way valve in each of said channels to expose the cylinder to the suction of either the manifold or venturi depending upon whichever is greater, the piston being movable within the cylinder under the influence of the depression in the cylinder against the action of said adjustable means.

3. A throttling device for controlling the flow into an internal combustion engine of the final air and fuel mixture, comprising a valve normally substantially obstructing the intake of said mixture into said engine, means coacting with said valve for yieldably holding it in its normal position, and means operatively connecting two suction portions of the engine remote from each other to said valve whereby an opening effort is exerted against the valve in response to the suction in that one of said portions where the depression is greater.

4. A throttling device for controlling the flow into an internal combustion engine of the final air and fuel mixture from the carburetor throttle valve, comprising an intermediate valve positioned in the intake passageway between said throttle valve and the cylinders of the engine, adjustable means cooperably connected to said intermediate valve and exerting a continuous closing effort thereon, and suction responsive means connected to and adapted to actuate said intermediate valve against the action of said adjustable means and operatively communicating with a suction portion of the engine on that side of the said intermediate valve remote from the carburetor.

5. In an internal combustion engine, an intake manifold, an intake conduit communicating between the carburetor throttle valve and the said manifold, an intermediate valve in said conduit for controlling the flow into the manifold of the final fuel and air mixture, yieldable means exerting a continuous closing effort on said intermediate valve, single suction responsive means operatively connected to said intermediate valve, and two passageways operatively connecting said suction responsive means with said manifold and said intake conduit respectively, whereby the depression in said manifold or intake conduit, which ever is greater, will actuate said suction responsive means to operate the intermediate valve against the action of said yieldable means.

6. In an internal combustion engine, a carburetor including a throttle valve, an intake manifold, an intake passageway for the final fuel and air mixture between the carburetor and intake manifold, an intermediate valve in said passageway for controlling the flow of said mixture, a cylinder communicating at one end with a region of substantially atmospheric pressure and at the other end with a suction portion of said intake passageway disposed on the engine side of the intermediate valve, a piston positioned within the cylinder and operatively connected to said intermediate valve, and a resilient member exterior of the said passageway and exerting a closing effort on the intermediate valve, the piston being movable within the cylinder under the influence of the depression in said intake passageway against the action of said yieldable member to operably move said intermediate valve.

7. In an internal combustion engine, a carburetor including a throttle valve, an intake manifold, an intake conduit communicating between the carburetor and the said manifold, an intermediate valve in said conduit for controlling the flow into the manifold of the final fuel and air mixture, yieldable means exerting a continuous closing effort on said intermediate valve, a single cylinder communicating at one end with a region of substantially atmospheric pressure and at the other end with said manifold and intake conduit respectively, a piston positioned within the cylinder and operatively connected to said intermediate valve, the piston being movable within the cylinder under the influence of the depression in said manifold or intake conduit, whichever is greater, against the action of said yieldable means to actuate the said intermediate valve.

8. In an internal combustion engine, an intake manifold, a carburetor including a throttle valve, an intake conduit communicating between said carburetor and said manifold, an intake valve in said conduit for controlling the flow into the manifold of the final fuel and air mixture, variably adjustable means exerting a continuous closing effort of predetermined magnitude on said intermediate valve, a piston operatively connected to said intermediate valve, a cylinder housing said piston and communicating at one portion thereof with a region of substantially atmospheric pressure and at another portion with said manifold, the piston being movable within the cylinder under the influence of the depression in said manifold against the action of said adjustable means to actuate the intermediate valve, said adjustable means being exterior of the conduit and adapted for direct connection with actuating means.

BERNARD C. PHILLIPS.